(12) United States Patent
Kurabayashi

(10) Patent No.: US 12,383,826 B2
(45) Date of Patent: Aug. 12, 2025

(54) GAME SYSTEM, EDGE-SIDE SERVER, CLOUD-SIDE SERVER, GAME TERMINAL, AND GAME CONTROL METHOD

(71) Applicant: CYGAMES, INC., Tokyo (JP)

(72) Inventor: Shuichi Kurabayashi, Tokyo (JP)

(73) Assignee: Cygames, Inc., Tokyo (JP)

( * ) Notice: Subject to any disclaimer, the term of this patent is extended or adjusted under 35 U.S.C. 154(b) by 337 days.

(21) Appl. No.: 18/302,550

(22) Filed: Apr. 18, 2023

(65) Prior Publication Data

US 2023/0256334 A1  Aug. 17, 2023

Related U.S. Application Data

(63) Continuation of application No. PCT/JP2021/038229, filed on Oct. 15, 2021.

(30) Foreign Application Priority Data

Oct. 21, 2020  (JP) ................. 2020-176463

(51) Int. Cl.
*A63F 13/355* (2014.01)
*A63F 13/352* (2014.01)

(52) U.S. Cl.
CPC .......... *A63F 13/355* (2014.09); *A63F 13/352* (2014.09)

(58) Field of Classification Search
CPC ............................ A63F 13/355; A63F 13/352
See application file for complete search history.

(56) References Cited

U.S. PATENT DOCUMENTS

| 11,565,177 B2 * | 1/2023 | Colenbrander .. H04N 21/23106 |
| 11,724,183 B2 * | 8/2023 | Perlman ............. H04N 21/2343 463/31 |
| 2020/0269132 A1 | 8/2020 | Turner et al. |

OTHER PUBLICATIONS

VirtualTech Japan: "hbstudy#88, System Design in the Era of 5G + MEC"; Jan. 17, 2020 (73 pages).
Amazon Web Services, Inc.: "AWS Wavelength"; [online] Internet <URL: https://aws.amazon.com/jp/wavelength/> retrieved Jul. 20, 2020 (1 page).
Alex Russell infrequently.org: "Infrequently Noted—Comet: Low Latency Data for the Browser"; [online] Internet <URL: https://infrequently.org/2006/03/comet-low-latency-data-for-the-browser/> Mar. 3, 2006 (4 pages).
Engadget: "Games streaming becomes (may become) a field representing 5G"; [online] internet <url: https:japanese.engadget.com/jp-2029-03-23-5g-5g.html> retrieved Feb. 2, 2021 (14 pages).
International Search Report issued in Application No. PCT/JP2021/038229, mailed on Jan. 11, 2022 (2 pages).

* cited by examiner

*Primary Examiner* — Reginald A Renwick
(74) *Attorney, Agent, or Firm* — Osha Bergman Watanabe & Burton LLP

(57) ABSTRACT

An edge-side server, upon receiving a request transmitted from a player terminal, transmits a first response to the request to the player terminal, and, per certain period, transmits an aggregation result, in which the results of processing based on requests are aggregated, to a cloud-side server. Then, the edge-side server receives the result of processing based on the aggregation result, executed at the cloud-side server, and transmits the result of processing as a second response to the player terminal. For a single request, the player terminal receives the first response and the second response in this order via asynchronous I/O from the edge-side server.

10 Claims, 12 Drawing Sheets

GAME SYSTEM, EDGE-SIDE SERVER, CLOUD-SIDE SERVER, GAME TERMINAL, AND GAME CONTROL METHOD

TECHNICAL FIELD

The present invention relates to game systems, edge-side servers, cloud-side servers, game terminals, and game control methods.

BACKGROUND ART

With 5G networks, which are the next-generation mobile networks, the network architecture will be changed in large scale in that, in addition to just increasing the bandwidth for the last one mile, it becomes possible to install servers outside the Internet. Known as a related technology is multi-access edge computing (MEC). Compared with the conventional cloud computing, which is based on horizontal distribution, i.e., a large number of servers are provided on a distributed manner on the cloud side, the greatest feature of MEC is vertical distribution, i.e., servers having computational capabilities are provided in a distributed manner on network paths, which enables edge-side servers and clients to communicate with each other with latencies as low as a few milliseconds.

Non-Patent Literatures 1 and 2 disclose related technologies. Non-Patent Literature 1 explains 5G networks and MEC, and proposes games as example applications of MEC. Non-Patent Literature 2 discloses the technology in which an edge-side server is incorporated at a data center of a communication service provider located at the edge of a 5G network, which makes it possible to realize low latency with games, live video streaming, machine learning inference at the edge, augmented reality, virtual reality, etc.

In addition, Non-Patent Literature 3 discloses content concerning Comet, with which an HTTP session is kept connected.

CITATION LIST

Non-Patent Literature

NPL 1

VirtualTech Japan Inc., "hbstudy#88, System Design in the Era of 5G+MEC", [online], 17 Jan. 2020, [retrieved on 20 Jul. 2020], Internet <URL: https://www.slideshare.net/VirtualTech-JP/hbstudy88-5gmec>

NPL 2

Amazon Web Services, Inc. "AWS Wavelength", [online], [retrieved on 20 Jul. 2020], Internet <URL: https://aws.amazon.com/jp/wavelength/>

NPL 3

"Comet: Low Latency Data for the Browser", 3 Mar. 2006, [retrieved on 20 Jul. 2020], Internet <URL: https://infrequently.org/2006/03/comet-low-latency-data-for-the-browser/>

SUMMARY OF INVENTION

Technical Problem

Non-Patent Literatures 1 and 2 both propose games as use cases of MEC, but do not disclose detailed technologies therefor. The present invention addresses the problem of simultaneously realizing scalability (massive connections) and response performance (low latency) of a game service at much higher levels compared with before.

Solution to Problem

The present invention provides a game system including a cloud-side server, an edge-side server, and a player terminal,
wherein the edge-side server includes:
an edge reception unit that receives requests transmitted from the player terminal;
a first edge processing unit that executes processing based on the requests and transmits the result of processing based on the requests to the player terminal as a first response to the requests; and
a second edge processing unit that, per certain period, transmits an aggregation result in which the results of processing based on the requests are aggregated to the cloud-side server, receives the result of processing based on the aggregation result, executed at the cloud-side server, and transmits the result of processing based on the aggregation result to the player terminal as a second response to the requests,
wherein the cloud-side server includes:
a cloud reception unit that receives the aggregation result transmitted from the edge-side server; and
a cloud processing unit that executes processing based on the aggregation result and transmits the result of processing based on the aggregation result to the edge-side server, and
wherein the player terminal includes:
a terminal transmission/reception unit that transmits the requests and receives, for one of the requests, the first response and the second response in this order via asynchronous I/O from the edge-side server.

Furthermore, the present invention provides a game control method that is executed by a game system including a cloud-side server, an edge-side server, and a player terminal,
wherein the edge-side server:
receives requests transmitted from the player terminal;
executes processing based on the requests and transmits the result of processing based on the requests to the player terminal as a first response to the requests; and
per certain period, transmits an aggregation result in which the results of processing based on the requests are aggregated to the cloud-side server, receives the result of processing based on the aggregation result, executed at the cloud-side server, and transmits the result of processing based on the aggregation result to the player terminal as a second response to the requests,
wherein the cloud-side server:
receives the aggregation result transmitted from the edge-side server; and
executes processing based on the aggregation result and transmits the result of processing based on the aggregation result to the edge-side server, and
wherein the player terminal:
transmits the requests and receives, for one of the requests, the first response and the second response in this order via asynchronous I/O from the edge-side server.

Furthermore, the present invention provides the edge-side server in the game system.

Furthermore, the present invention provides the cloud-side server in the game system.

Furthermore, the present invention provides the player terminal in the game system.

Advantageous Effects of Invention

The present invention makes it possible to simultaneously realize scalability (massive connections) and response performance (low latency) of a game service at much higher levels compared with before.

DESCRIPTION OF EMBODIMENTS

First Embodiment

Summary

This embodiment, in view of the increasing availability of 5G+MEC, which is a new edge computing infrastructure, proposes a new Web API implementation method that is suitable for vertical distribution, in which servers having computational capabilities are disposed on network paths in a distributed manner. With conventional cloud computing, which is based on horizontal distribution, in which a large number of servers are disposed on the cloud side in a distributed manner, the scheme has been extremely simple in that a Web API that is exposed to the outside returns a response as quickly as possible after it is called. A technical feature of this embodiment consists in progressive response: that is, when a large number of clients call a single Web API, an edge-side server immediately (in a few milliseconds) returns tentative responses to the clients, while the edge-side server aggregates a plurality of requests received, calls the same Web API on the cloud, and subsequently (in a few hundred milliseconds) returns the final computation results obtained from a cloud-side server in addition. Service scalability and response performance are realized simultaneously with the aggregative request handling and progressive response described above.

For each client that calls a Web API according to this embodiment, just by loading a single Web API through asynchronous processing, it is possible to first receive an immediate response reflecting local information at the edge-side server, and to then additionally receive a global and final response from the cloud-side server. Furthermore, since the client receives the two responses mentioned above via asynchronous I/O, the client can receive the response from the cloud-side server while rendering an effect corresponding to the response from the edge-side server in the form of an animation or the like. As described above, while a first screen corresponding to a quick response from the edge-side server is displayed, a response from the cloud-side server is received, and a second screen corresponding to the response from the cloud-side server is displayed seamlessly with the first screen displayed as described above. Thus, an advantage is afforded in that it looks to the player as if the response from the cloud-side server were received and displayed on the screen at the speed of the response from the edge-side server (i.e., communication latency is not perceived).

Overview

Figure 1:
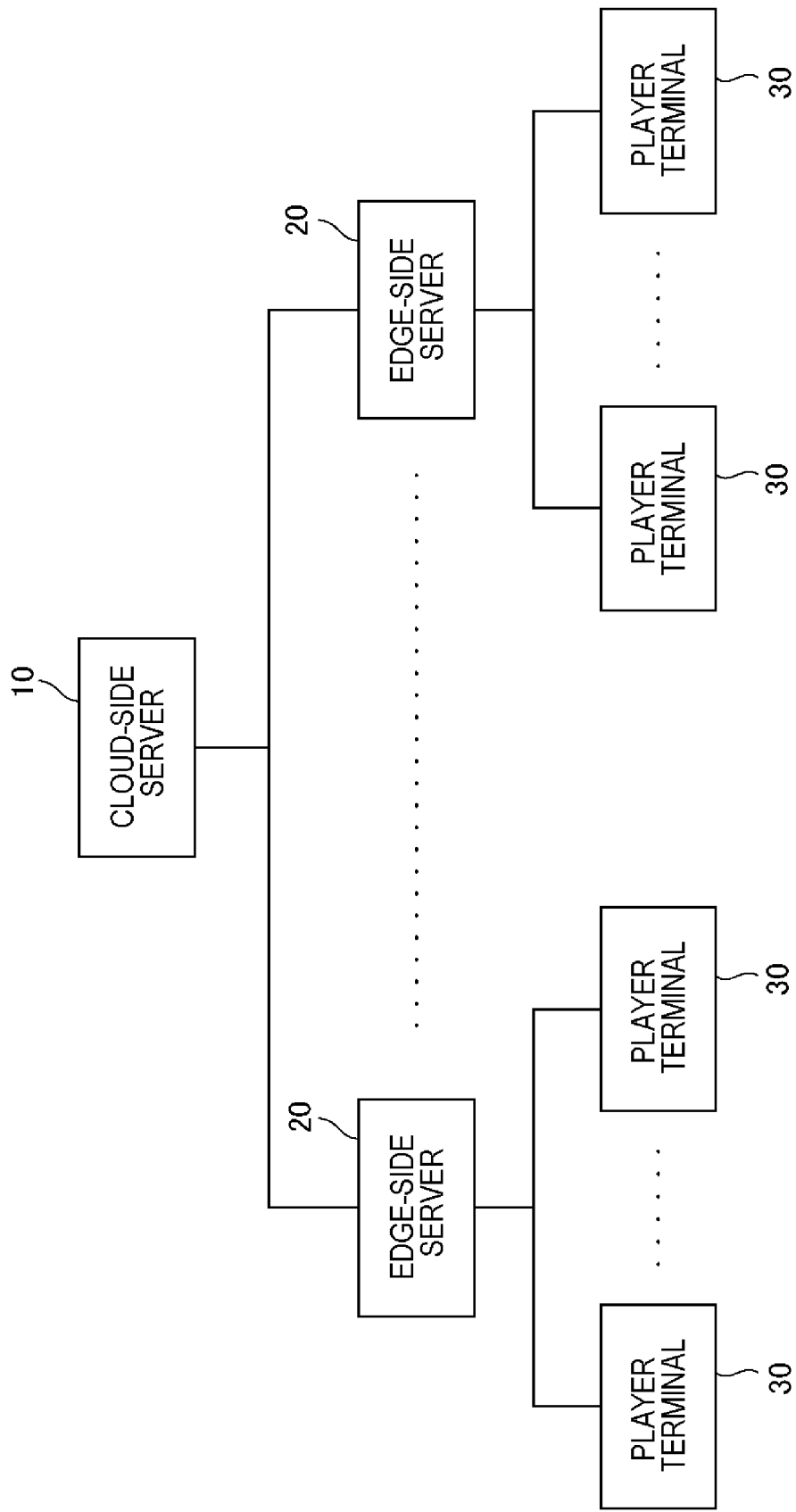
FIG. 1 is a diagram for explaining an overview of a game system according to this embodiment.

Next, an overview of a game system according to this embodiment will be described. As shown in FIG. 1, the game system includes a cloud-side server 10, a plurality of edge-side servers 20, and a plurality of player terminals 30.

The player terminals 30 are mobile terminals that are operated by players. Examples thereof include, but are not limited to, smartphones, tablets, personal computers, game machines, smart watches, and mobile phones. The edge-side servers 20 are what are called MEC servers. The cloud-side server 10 is a server that is installed on the cloud side.

Figure 2:
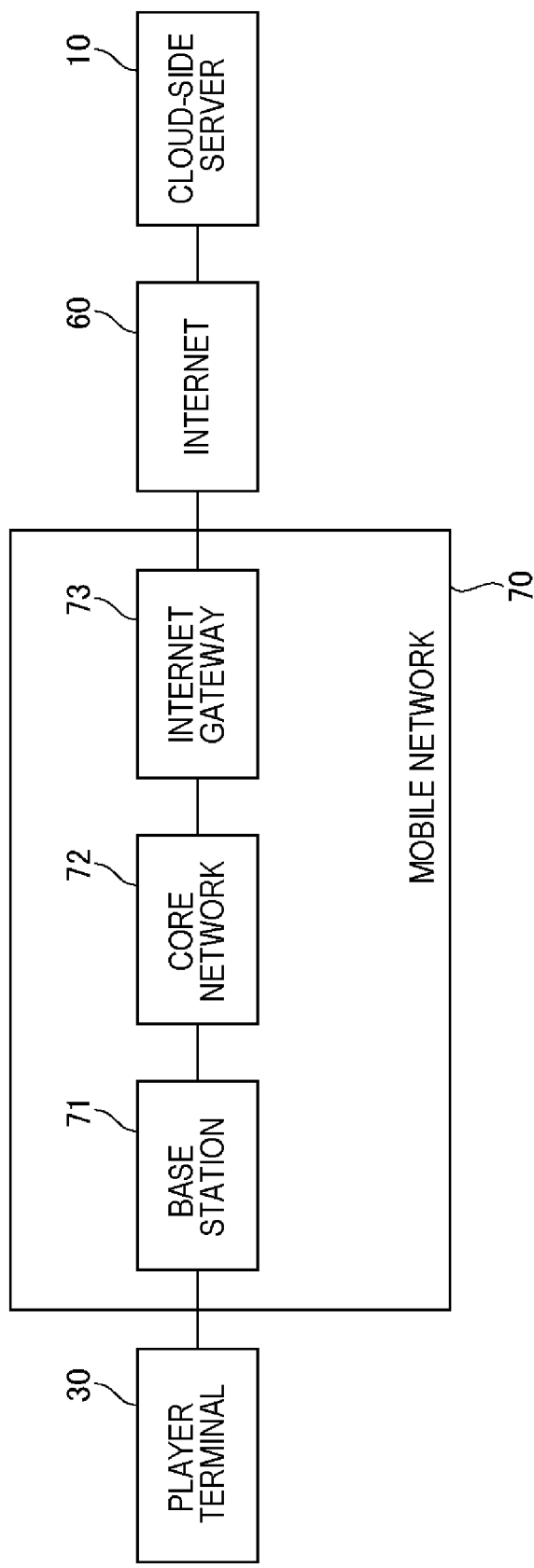
FIG. 2 is a diagram for explaining an overview of the game system according to this embodiment.

As shown in FIG. 2, the player terminal 30 and the cloud-side server 10 communicate with each other via a mobile network 70 and the Internet 60. The mobile network 70 is a 5G network. The mobile network 70 includes base stations 71, a core network 72, Internet gateways 73, etc. As is apparent from FIG. 2, the Internet 60 in this embodiment is a concept not including the mobile network 70 that the player terminals 30 are connected.

Although not shown in FIG. 2, the edge-side servers 20 are located within the mobile network 70. Furthermore, the player terminals 30 and the edge-side servers 20 communicate with each other without using the Internet 60. Although there are no particular limitations concerning the positions where the edge-side servers 20 are installed, examples include positions within the equipment of the base stations 71 or the core network 72 of a communication service provider.

As shown in FIG. 1, each of the plurality of player terminals 30 communicates with one of the plurality of edge-side servers 20. This means that each of the plurality of player terminals 30 does not communicate with the plurality of edge-side servers 20 simultaneously. For example, depending on changes in the position of a player terminal 30, the edge-side server 20 that communicates with that player terminal 30 may be changed. For example, each of the player terminals 30 communicates with an edge-side server 20 installed in a base station 71 to which the local terminal is connected.

Functional Configuration

Next, the functional configuration of the game system will be described with reference to FIGS. 3 to 6.

Figure 3:
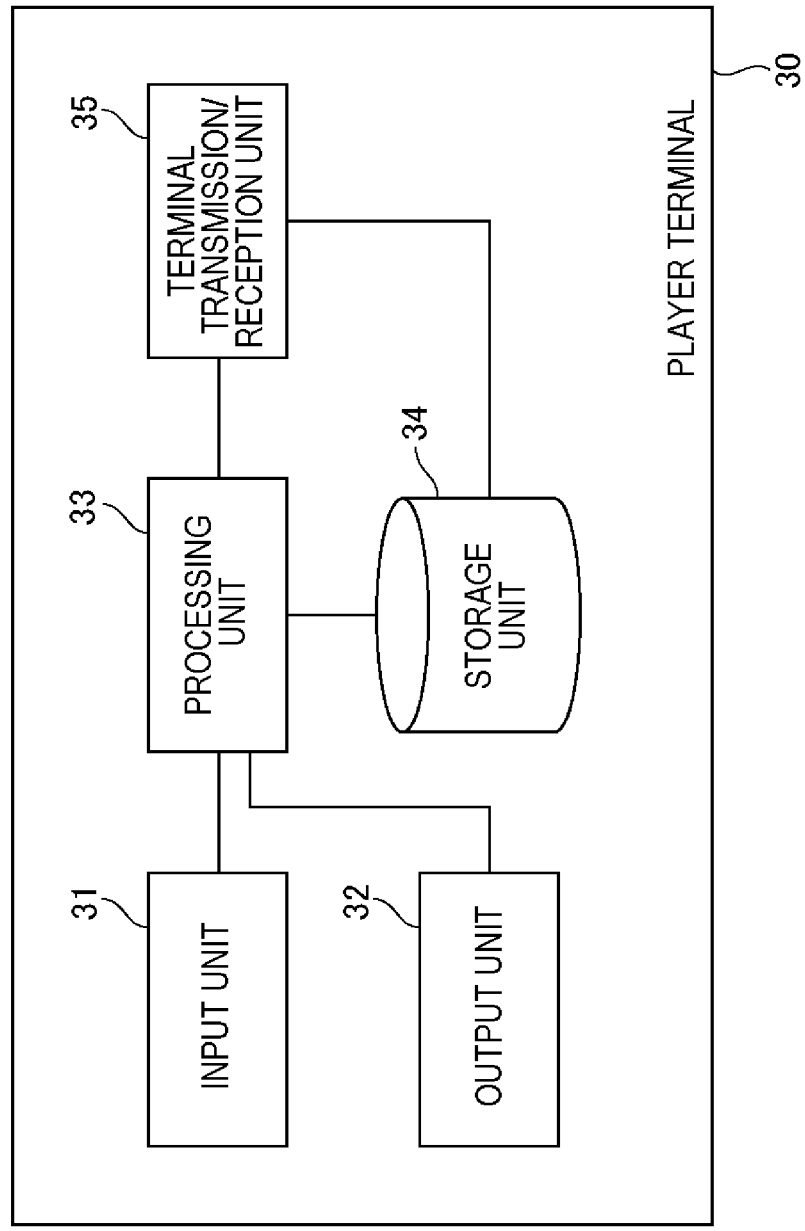
FIG. 3 is a diagram showing an example of functional blocks of a player terminal according to this embodiment.

FIG. 3 shows an example functional block diagram of a player terminal 30. As shown in the figure, the player terminal 30 includes an input unit 31, an output unit 32, a processing unit 33, a storage unit 34, and a terminal transmission/reception unit 35.

These functional units realize functions including the following: a function for accepting an input from the player; a function for transmitting a request based on the content of the input to a server; a function for receiving a response to the request from the server; and a function for displaying a screen corresponding to the response received.

Figure 4:
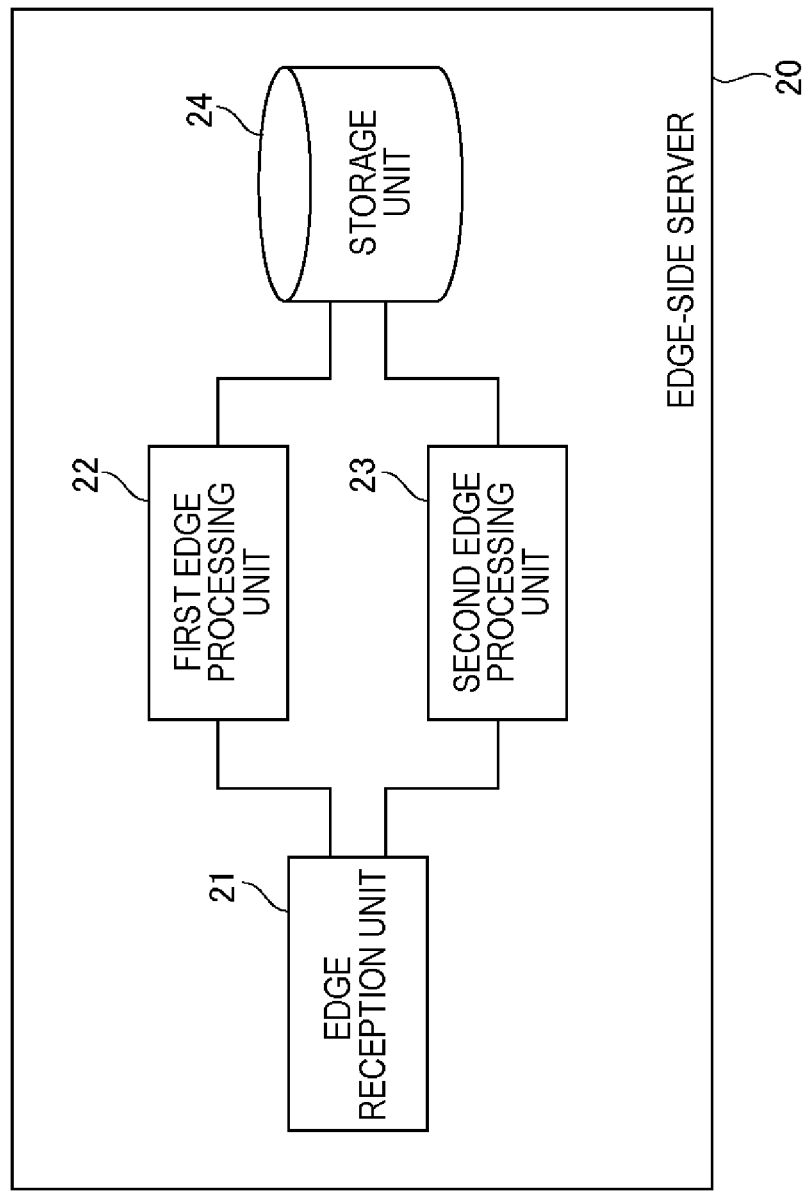
FIG. 4 is a diagram showing an example of functional blocks of an edge-side server according to this embodiment.

FIG. 4 shows an example functional block diagram of an edge-side server 20. As shown in the figure, the edge-side server 20 includes an edge reception unit 21, a first edge processing unit 22, a second edge processing unit 23, and a storage unit 24.

These functional units realize functions including the following: a function for receiving a request transmitted from a player terminal 30 that communicates with the local device (the edge-side server 20); a function for returning the result of processing based on the request received from the player terminal 30, as a tentative result of processing, to the player terminal 30; a function for transmitting an aggregation result, in which the results of processing based on requests received from the player terminal 30 are aggregated, to the cloud-side server 10; and a function for receiving the final result of processing, based on the aggregation result, from the cloud-side server 10 and returning the final result to the player terminal 30.

Figure 5:
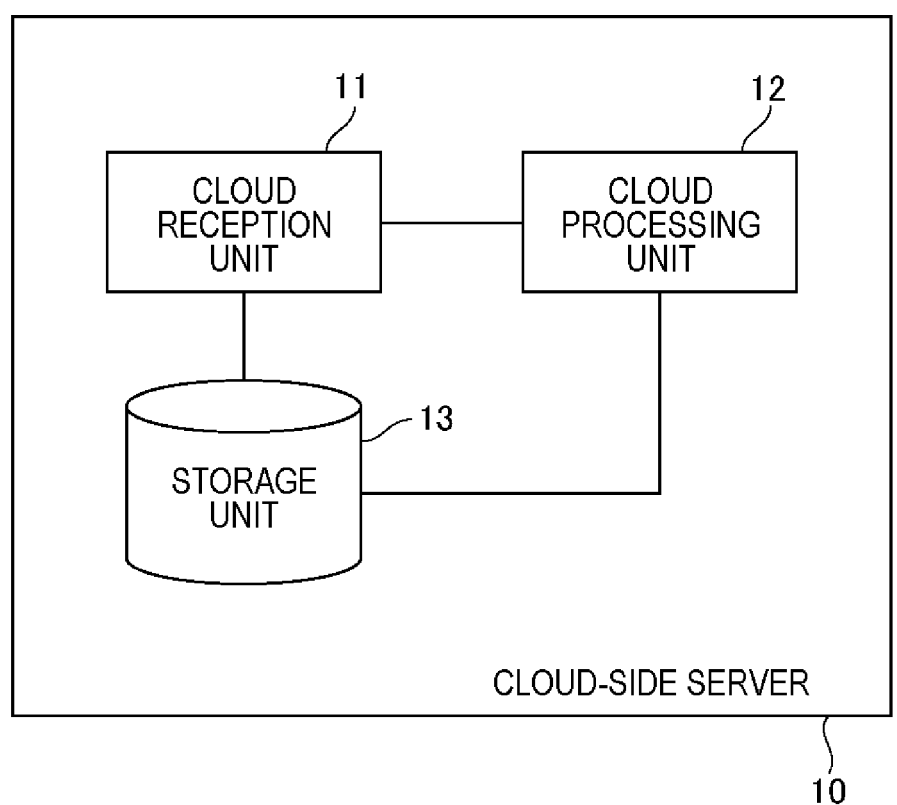
FIG. 5 is a diagram showing an example of functional blocks of a cloud-side server according to this embodiment.

FIG. 5 shows an example functional block diagram of the cloud-side server 10. As shown in the figure, the cloud-side server 10 includes a cloud reception unit 11, a cloud processing unit 12, and a storage unit 13.

These functional units realize functions including the following: a function for receiving aggregation results such as the one mentioned above individually from the plurality of edge-side servers 20; a function for calculating the final result of processing, based on the plurality of aggregation results individually received from the plurality of edge-side servers 20; and a function for transmitting the calculated final result of processing to the edge-side servers 20.

Figure 6:
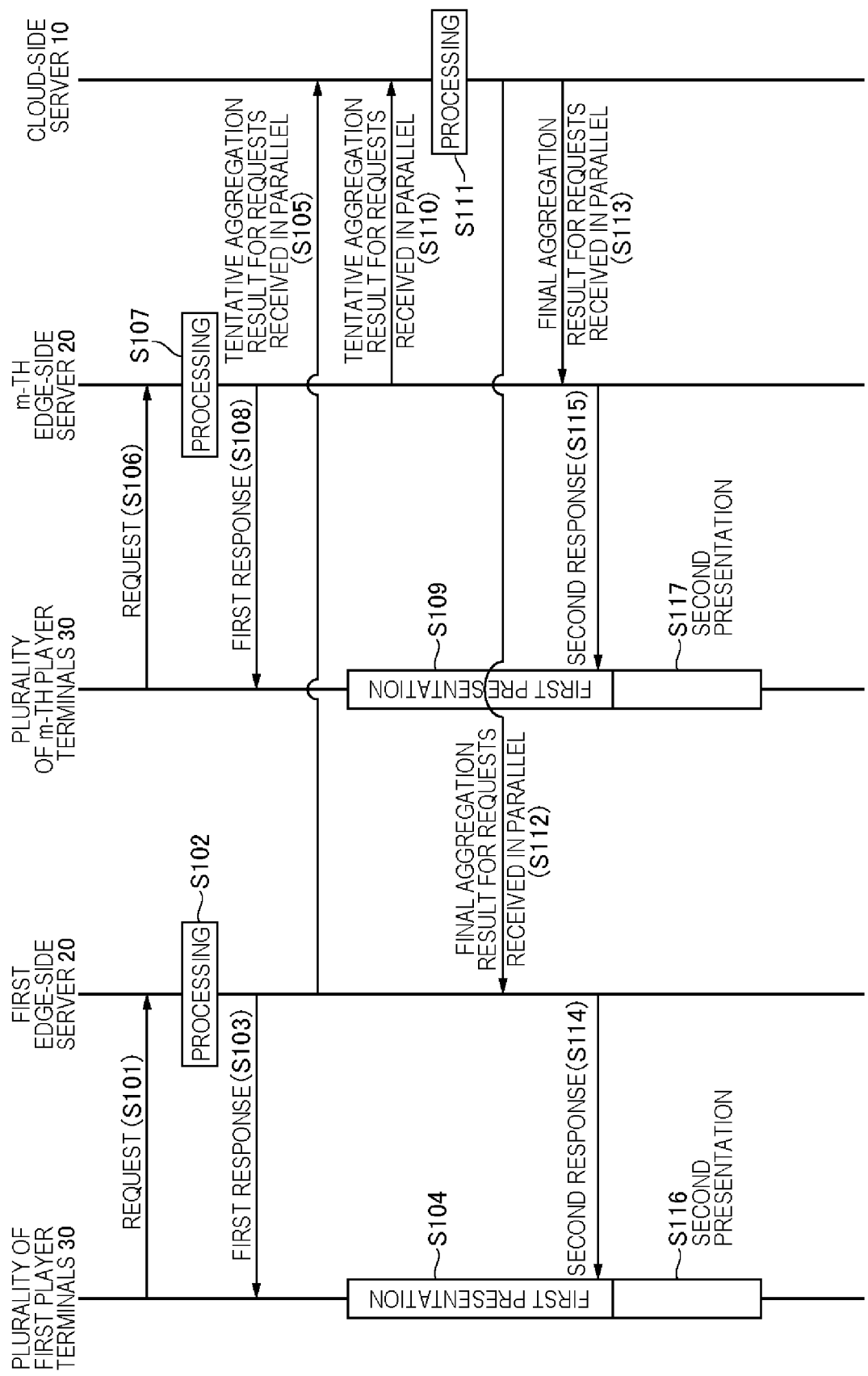
FIG. 6 is a sequence chart showing an example flow of processing by the game system according to this embodiment.

FIG. 6 is a sequence chart showing an example flow of processing by the game system. More specifically, FIG. 6 shows the flow of processing that is executed during a relatively short time from when a plurality of players perform prescribed operations (e.g., attacks) at the individual player terminals 30 at an arbitrary timing while the game is in progress to when screens corresponding to the operations are displayed at the player terminals 30. The following describes in detail the functional configurations of the individual functional units shown in FIGS. 3 to 5, together with the flow of processing.

It is presupposed that a large number of players simultaneously participate in the game provided by the game system according to this embodiment and that operations performed by each player affect the proceeding of the game for the other players. Examples include, but are not limited to, raid battles in massively multiplayer online role-playing games (MMORPGs).

FIG. 6 shows a plurality of first player terminals 30, a first edge-side server 20, a plurality of m-th player terminals 30, an m-th edge-side server 20, and the cloud-side server 10.

The plurality of first player terminals 30 are player terminals 30 that are operated by some players among the plurality of players participating in the game. The plurality of first player terminals 30 commonly communicate with the same edge-side server 20 (the first edge-side server 20). For example, the plurality of first player terminals 30 are connected to the same base station. Furthermore, the first edge-side server 20 is installed, for example, in the base station to which the plurality of first player terminals 30 are connected.

Similarly, the plurality of m-th player terminals 30 are player terminals 30 that are operated by some players among the plurality of players participating in the game. The plurality of m-th player terminals 30 commonly communicate with the same edge-side server 20 (the m-th edge-side server 20). For example, the plurality of m-th player terminals 30 are connected to the same base station. Furthermore, the m-th edge-side server 20 is installed, for example, in the base station to which the plurality of m-th player terminals 30 are connected.

Note that although two edge-side servers 20 and two groups of a plurality of player terminals 30 are shown in the figure, the numbers of edge-side servers and groups of a plurality of player terminals are not limited to the numbers shown in the figure.

First, each of the plurality of first player terminals 30 transmits a request, generated on the basis of an input from the player, to the server (S101). The requests transmitted from the plurality of first player terminals 30 are received by the first edge-side server 20.

Regarding the processing in S101, the input unit 31 receives an operation from the player via an arbitrary input device, such as a touch panel, a physical button, a microphone, a keyboard, or a mouse. For example, the input unit 31 accepts an operation for attacking an enemy character or an operation for defending against an enemy character. The processing unit 33 generates a request indicating the input content (an attack request, a defense request, or the like). The terminal transmission/reception unit 35 calls a prescribed Web API and transmits the generated request.

The first edge-side server 20, upon receiving the requests transmitted from the plurality of first player terminals 30 (S101), executes processing based on the plurality of requests received (S102), and transmits the result of the processing based on the requests to the plurality of first player terminals 30 as a first response to the requests (S103). The reception of requests in S101 is realized by the edge reception unit 21, and the processing in S102 and S103 are realized by the first edge processing unit 22.

The first edge processing unit 22 calculates locally consistent processing results by using data relating to some (the players operating the plurality of first player terminals 30) of the plurality of players participating in the game.

For example, the first edge processing unit 22 calculates the results (whether or not the enemy character is damaged, the amounts of damage, etc.) based on the attack requests individually transmitted from the plurality of first player terminals 30, and then calculates an aggregation result (the total amount of damage or the like given to the enemy character as a result of the plurality of attack requests) in which the results of the plurality of attack requests are aggregated. Then, the first edge processing unit 22 transmits the aggregation result (whether or not the enemy character is damaged, the total amount of damage given to the enemy character, etc. as a result of the plurality of attack requests), in which the results of the plurality of attack requests are aggregated, to the plurality of first player terminals 30 as a first response.

Furthermore, the second edge processing unit 23 transmits an aggregation result to the cloud-side server 10 per certain period, the aggregation result being the result of aggregating the results of processing based on the requests individually transmitted from the plurality of first player terminals 30 (S105).

Note that the abovementioned aggregation result calculated by each of the edge-side servers 20 is the result of aggregating the results of requests from some (the players operating the player terminals 30 communicating with the edge-side server 20) of the spatially distributed plurality of players. Hereinafter, the aggregation result calculated by each of the edge-side servers 20 will be referred to as "a tentative aggregation result for requests received in parallel".

The plurality of first player terminals 30, upon receiving the first response (S103), performs a first presentation corresponding to the first response (S104). Specifically, when the first response is received by the terminal transmission/reception unit 35, the processing unit 33 generates data for realizing the first presentation on the basis of the first response and data stored in the storage unit 34, and then causes the output unit 32 to execute the first presentation.

Figure 7:
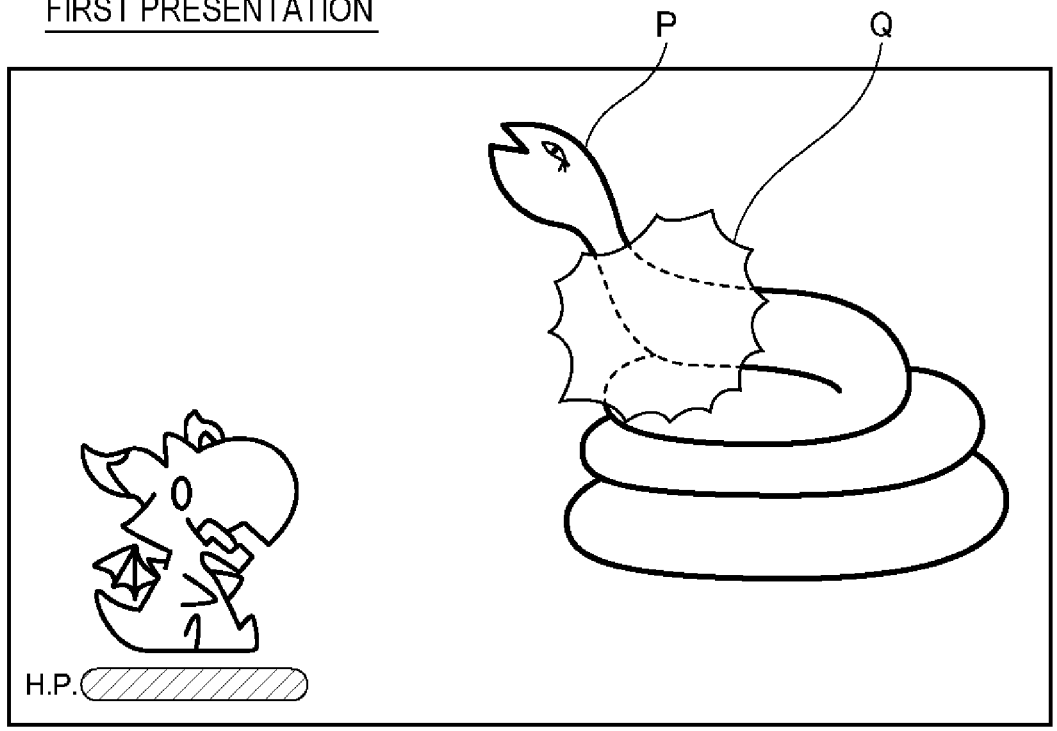
FIG. 7 is an illustration showing an example first presentation realized by the game system according to this embodiment.
Figure 8:
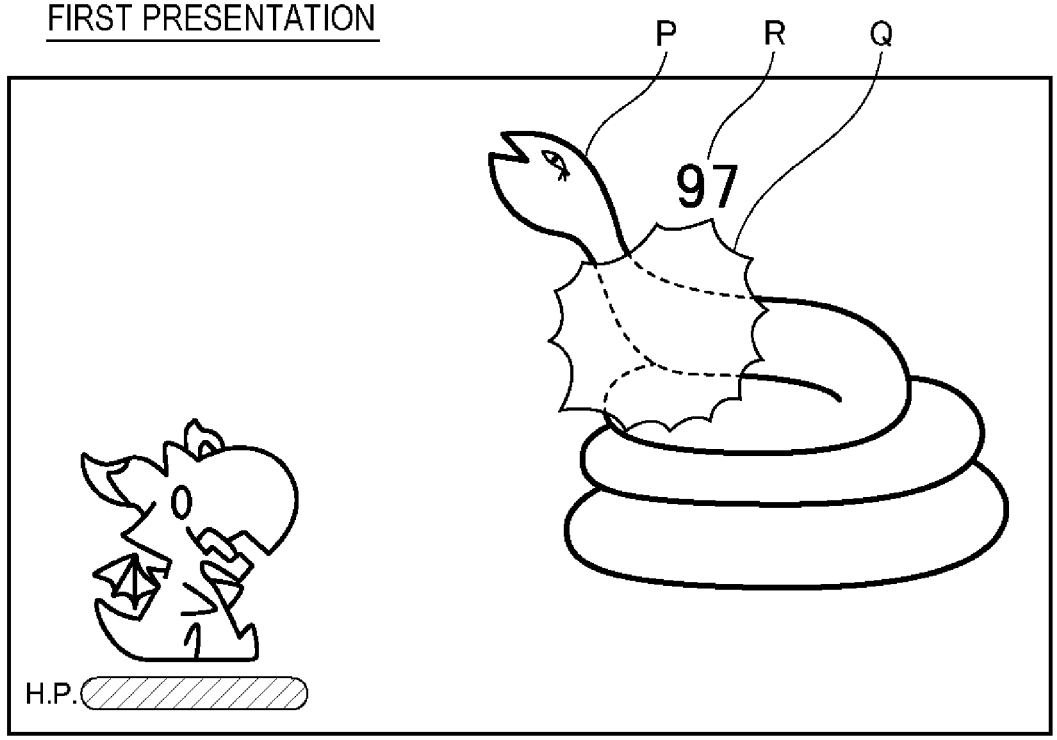
FIG. 8 is an illustration showing an example first presentation realized by the game system according to this embodiment.

In the case where the requests transmitted in S101 are attack requests, a conceivable example of the first presentation is an effect presentation Q indicating that a damage has been given to an enemy character P, for example, as shown in FIG. 7. Alternatively, in addition to the effect presentation Q, the amount R of damage given to the enemy character P, indicated by "a tentative aggregation result for requests received in parallel" may be included, as shown in FIG. 8.

The duration of the first presentation (S104) is designed so that the first presentation will be continued until a second presentation (S116) corresponding to a subsequent second response is started.

The same processing as the above-described processing by the plurality of first player terminals 30 and the first edge-side server 20 is executed at the same timing by the other player terminals 30 and the other edge-side servers 20 (S106 to S110).

Note that the content of the first response that is received by the plurality of first player terminals 30 from the first edge-side server 20 may differ from the content of the first response that is received by the plurality of m-th player terminals 30 from the m-th edge-side server 20. Thus, the content of the first presentation that is displayed on the plurality of first player terminals 30 may differ from the content of the first presentation that is displayed on the plurality of m-th player terminals 30. For example, the amount R of damage, shown in the example shown in FIG. 8, may be different values.

Meanwhile, the content of the first response that is received by the plurality of first player terminals 30 from the first edge-side server 20 is the same. Thus, the content of the first presentation that is displayed on the plurality of first player terminals 30 is the same. For example, the amount R of damage, shown in the example shown in FIG. 8, is the same value. Similarly, the content of the first response that is received by the plurality of m-th player terminals 30 from the m-th edge-side server 20 is the same. Thus, the content of the first response that is displayed on the plurality of m-th player terminals 30 is the same. For example, the amount R of damage, shown in the example shown in FIG. 8, is the same value.

Then, the cloud-side server 10 executes processing based on "tentative aggregation results for requests received in parallel", individually received from the plurality of edge-side servers 20 (S111), and transmits the result of processing to the plurality of edge-side servers 20 (S112 and S113). The processing for receiving "tentative aggregation results for requests received in parallel" individually from the plurality of edge-side servers 20 is realized by the cloud reception unit 11, and the processing in S111 to S113 is realized by the cloud processing unit 12.

For example, the cloud processing unit 12 calculates the sum of the values of damage given to the enemy character, individually indicated by the "tentative aggregation results for requests received in parallel" individually received from the plurality of edge-side servers 20. Then, the cloud processing unit 12 transmits the sum of damage values to the plurality of edge-side servers 20.

Note that the abovementioned processing result that is calculated by the cloud processing unit 12 is the result of aggregating the "tentative aggregation results for requests received in parallel" received from the plurality of edge-side servers 20, i.e., the result of aggregating the results for all the requests from the plurality of spatially distributed players. Hereinafter, the processing result that is calculated by the cloud processing unit 12 will be referred to as "a final aggregation result for requests received in parallel".

The first edge-side server 20, upon receiving the "final aggregation result for requests received in parallel" from the cloud-side server 10 (S112), transmits the "final aggregation result for requests received in parallel" to the plurality of first player terminals 30 as a second response to the requests received in S101 (S114). The processing in S112 and S114 is realized by the second edge processing unit 23.

The plurality of first player terminals 30, upon receiving the second response (S114), performs a second presentation corresponding to the second response (S116). Specifically, when the second response is received by the terminal transmission/reception unit 35, the processing unit 33 generates data for realizing the second presentation on the basis of the second response and data stored in the storage unit 34, and then causes the output unit 32 to execute the second presentation.

Note that, as described earlier, the duration of the first presentation (S104) is designed so that the first presentation will be continued until the subsequent second presentation (S116) corresponding to the second response is started. Thus, the processing unit 33 starts the second presentation (S116) before the first presentation (S104) comes to an end. That is, the first presentation (S104) and the second presentation (S116) are connected seamlessly.

Figure 9:
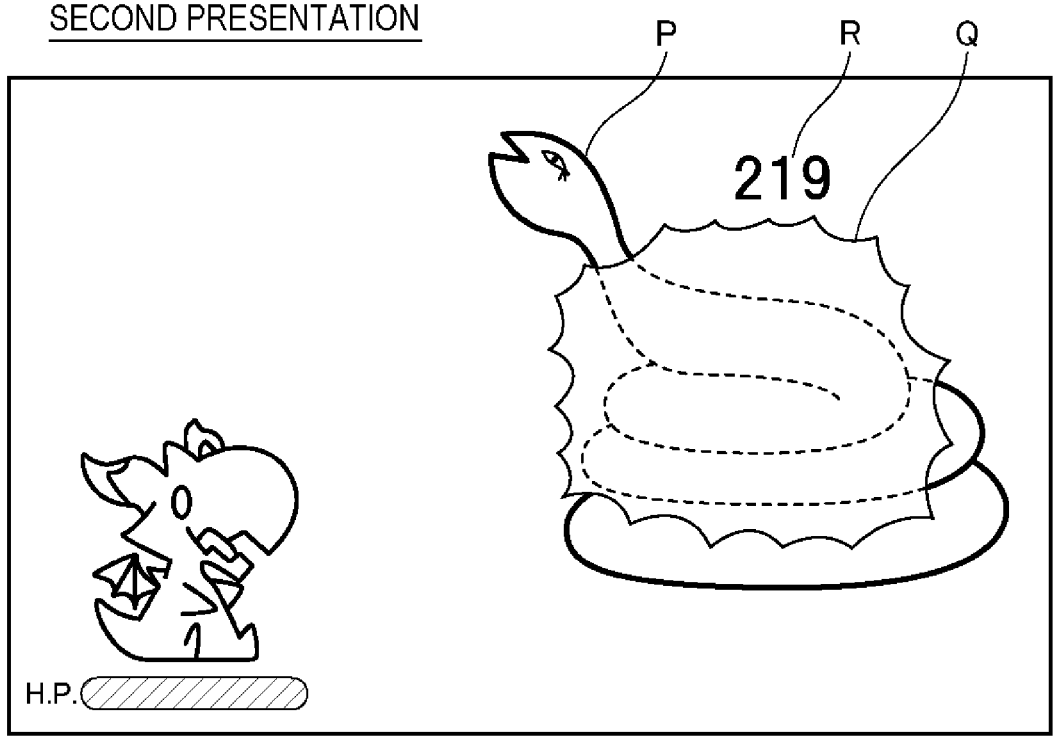
FIG. 9 is an illustration showing an example second presentation realized by the game system according to this embodiment.

In the case where the requests transmitted in S101 are attack requests, a conceivable example of the second presentation is an effect presentation Q indicating that a damage has been given to the enemy character P, as well as a presentation of the amount R of damage given to the enemy character P, indicated by the "final aggregation result for requests received in parallel", for example, as shown in FIG. 9.

Note that the same processing as the above-described processing by the plurality of first player terminals 30 and the first edge-side server 20 is executed at the same timing by the other player terminals 30 and the other edge-side servers 20 (S113, S115, and S117).

The content of the second response that is received by the plurality of first player terminals 30 from the first edge-side server 20 and the content of the second response that is received by the plurality of m-th player terminals 30 from the m-th edge-side server 20 are the same. Thus, the content of the second presentation that is displayed on the plurality of first player terminals 30 and the content of the second presentation that is displayed on the plurality of m-th player terminals 30 are the same. For example, the amount R of damage, shown in the example shown in FIG. 9, is the same value.

Meanwhile, a player terminal 30, after transmitting a request (S101 or S106), receives the first response and the second response in this order to that single request from the plurality of edge-side servers 20 via asynchronous I/O (S103 and S114 or S108 and S115). Thus, the player terminal 30 can perform the first presentation corresponding to the first response during the period after the first response is received and before the second response is received (S104 or S109).

"Hardware Configuration"

Next, the hardware configurations of the individual devices (the cloud-side server 10, the edge-side servers 20, and the player terminals 30) for realizing the game system will be described. The individual functional units provided in the individual devices in this embodiment are realized by arbitrary combinations of hardware and software, mainly including a central processing unit of an arbitrary computer, a memory, programs that are loaded into the memory, a storage unit that stores the programs, such as a hard disc (which can store programs stored in advance at the time of shipping of the device, as well as programs downloaded from a storage medium such as a compact disc (CD) or a server on the Internet or the like), and a network connection interface. Furthermore, it will be understood by a person skilled in the art that there are various modifications for the method and devices for implementation thereof.

Figure 10:
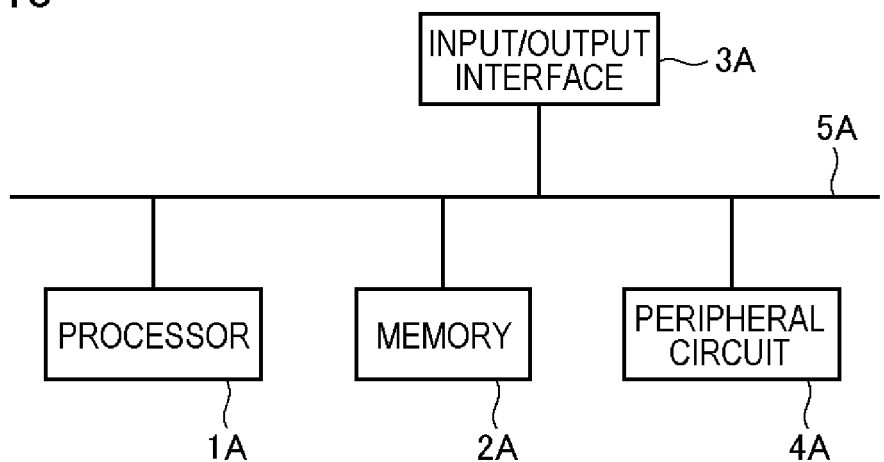
FIG. 10 is a diagram showing an example hardware configuration of devices according to this embodiment.

FIG. 10 is a block diagram showing an example hardware configuration of each of the devices in this embodiment. As shown in FIG. 2, each of the devices includes a processor 1A, a memory 2A, an input/output interface 3A, a peripheral circuit 4A, and a bus 5A. The peripheral circuit 4A includes various modules. Note that each of the devices need not include the peripheral circuit 4A.

Note that the cloud-side server 10 and the edge-side servers 20 may be constituted of a plurality of physically and/or logically separate devices. In this case, each of the devices may have the hardware configuration described above. Alternatively, the cloud-side server 10 and the edge-side server 20 may be constituted of a physically and logically single device.

The bus 5A is a data transmission path for the processor 1A, the memory 2A, the peripheral circuit 4A, and the input/output interface 3A to mutually transmit and receive data. The processor 1A is a computational processing device, such as a CPU or a graphics processing unit (GPU). The memory 2A is a memory such as a random access memory (RAM) or a read only memory (ROM). The input/output interface 3A includes interfaces for obtaining information from input devices, external devices, external servers, external sensors, etc., as well interfaces for outputting information to output devices, external devices, external servers, etc. The input devices include, for example, a keyboard, a mouse, and a microphone. The output devices include, for example, a display, a speaker, a printer, and a mailer. The processor 1A can issue instructions to the individual modules and to perform computations on the basis of the results of computations by the modules.

EXAMPLE

Figure 11:
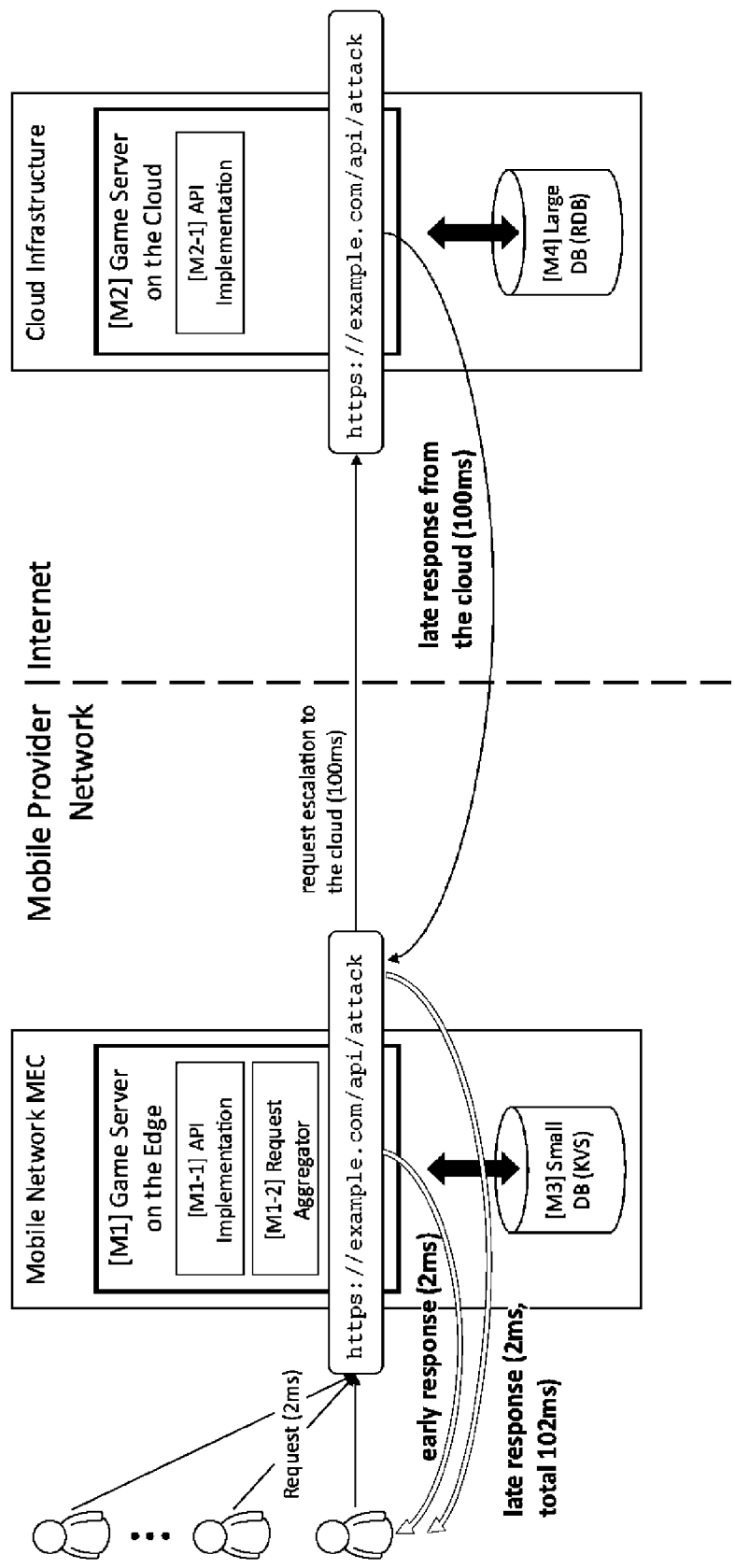
FIG. 11 is an illustration for explaining an example of the game system according to this embodiment.

Next, an example of the first embodiment will be described. FIG. 11 shows an overview of this example. In this example, with an API that is used on a conventional cloud, high response performance and high scalability are simultaneously realized by realizing the following two functions by using 5G MEC infrastructure:

(1) A function for aggregating requests from the player terminals 30 at the edge-side servers 20 and then transmitting the results to the cloud-side server 10, with the same API as for the cloud-side server 10 made publicly available at the edge-side servers 20; and (2) A function for asynchronously transmitting immediate responses from the edge-side servers 20 to the player terminals 30 and responses from the cloud-side server 10 to the player terminals 30.

The game system in this example is constituted of the following six modules.

[M1] Game server on the Edge is a game server disposed in the MEC infrastructure, and corresponds to an edge-side server 20. Although the same functions as the functions of a conventional game server (the cloud-side server 10) that is run on a cloud are implemented, there is a difference in that the database that is used is limited. [M1] implements the following two functions.

[M1-1] API Implementation is the implementation of an API that processes requests by the same logic as [M2-1] API Implementation provided in [M2] Game Server on the Cloud, that calculates the results of actions in the game, and that immediately returns the results to the clients (player terminals 30). [M1-1] implements different functions for individual games and individual embodiments; however, [M1-1] can be considered as an ordinary REST API in that the module interprets a request received from the outside as a command in the game and returns a response after performing a certain computation.

A significant difference between this module and the cloud-side module is that [M1-1] calculates a consistent result by using only information that is known to the module [M1], i.e., information concerning players in a specific region, and returns the first response immediately (e.g., within 5 ms). The local information limited to [M1], which is referred to here, is stored in [M3] Small DB. Furthermore, at this time, after the first response is transmitted, the connection (session) between [M1] Game Server on the Edge and the client is maintained instead of being disconnected.

[M1-2] Request Aggregator is a module that aggregates requests (e.g., by summing the values of damage given to the enemy character) per certain period and calls the corresponding API of [M2]. Here, as a conceivable method of aggregating requests, it is conceivable to calculate the total amount of damage given to a single enemy character by a plurality of players.

[M2] Game Server on the Cloud is a game server of the type that has hitherto been used, and corresponds to the cloud-side server 10. With [M2], functions that are called from clients are made publicly available to the outside as a Web API. In the present invention, [M2] can be considered as a module that executes the API at a fixed frequency (the frequency that is set in [M1] is the upper limit at the highest) and with a small number of simultaneous connections (the number of modules [M1] installed at most), that calculates a globally consistent result by using the database [M4], and that returns the result to [M1]. [M2] is constituted of at least the following one submodule.

[M2-1] API Implementation is a module that implements the logic of the cloud-side game server, which is the same as before. This module shares substantially all the functions with [M1-1].

[M3] Small DB is a database for saving the game statuses of some of the plurality of players participating in the game.

[M3] provided for each module [M1] saves the game statuses of players operating the clients that communicate with that module [M1].

[M4] Large DB is a database for saving the game statuses of all the players participating in the game, and is a game database of the type that has hitherto been used.

FIG. 11 shows approximate estimations of the time needed for the transmission/reception of each item of data. Note that the times are merely approximate estimations, and the times needed are not limited thereto. The approximate estimation of the time for communication between [M1] and a client is about 2 ms. The approximate estimation of the time for communication between [M1] and [M2] is about 100 ms.

Note that in the case where a player terminal 30 is connected to the Internet 60 via a network (a mobile network such as a 3G or 4G network, a wireless LAN, or the like) other than a 5G network, the player terminal 30 directly (without using the edge-side server 20) communicates with the cloud-side server 10 and simply calls the API having the same URL, which makes it easy to perform fallback. In this case, it is possible to use the API simply as an API having the same response speed as the current response speed.

Next, a specific example of the method of communication in this example will be described.

(1) When a REST API for an attack is called by a client, [M1-1] of [M1], which is located on the edge side (downstream) of the network, returns a tentative response for the result of the single attack request at a response speed of about 3 ms. Note, however, that the response connection is maintained without being disconnected, like the conventional Comet connection. Here, since [M1] receives requests from the clients connected to the same mobile station (or core network equipment), it is possible to calculate the total amount of damage in a specific region (the amount of local damage), which makes it possible to return the total amount of damage in the specific region as a response. [M1-2] is in charge of calculating such a total value.

(2) While the client is rendering an animation (preferably an animation lasting 200 ms or longer) corresponding to the tentative response on the UI, [M1-2] of [M1] transmits the total amount of damage in the specific region, described above, to [M2]. [M2] can implement attack processing for calculating the sum of the amounts of damage given by all the players (e.g., about one million) (the amount of global damage), for example, by summing the total amounts of damage (the amounts of local damage) corresponding to the number of base stations.

(3) After the elapse of about 200 ms, [M2] returns the sum of the amounts of damage given by all the players (e.g., about one million) (the amount of global damage) to [M1] as a response. [M1] additionally returns the amount of global damage to the client, and finishes the response.

(4) The client renders an effect for the amount of global damage so as to seamlessly update the animation being rendered and corresponding to the tentative response (e.g., seamlessly change from FIG. 7 to FIG. 9 or seamlessly change from FIG. 8 to FIG. 9). As described above, for a client, just by asynchronously reading responses from a single API, it is possible to receive a local computation result, which is 5G-specific, for example, in about 3 ms, and to receive a global computation result in about 200 ms thereafter, which is calculated by a conventional cloud.

Next, an example of the method of parsing responses at the client side in this example will be described.

Generally, data having a tree structure, such as JSON, is often adopted for values that are returned by Web APIs utilized by rich clients, such as HTML5 and native apps. When reading (parsing) JSON at a client, it is often the case to adopt the method in which the entire JSON data is loaded into a memory and the tree structure thereof is entirely reproduced in the form of data structures (objects) of a programming language. However, according to this example, responses in the form of JSON data or the like are returned progressively with a time difference such that, for example, only a beginning portion is returned in 5 ms and the entire remaining is returned in 100 ms thereafter, and thus it is not possible to enjoy the benefit of low latency, which is a merit of this example, with the conventional standard parsing method for JSON.

Accordingly, as a parsing method for JSON, it is possible to use an event-driven API, with which a JSON document is expressed as a series of events instead of being handled as a tree structure. Such an event-driven API is called SAX (Simple API for XML) in the field of XML parsers, and JSON Parser also provides an event-driven API as "SAX-like API". For example, SAX-like API is supported by stream-json (https://github.com/uhop/stream-json) in JavaScript and by RapidJSON (http://rapidjson.org) in C++. With SAX-like API, an application is notified of the starts and ends of hierarchical structures, attribute definitions, etc. in JSON sequentially as events, and thus it is possible to parse JSON segments immediately.

"Operations and Advantages"

This embodiment, in view of the increasing availability of 5G+MEC, which is a new edge computing infrastructure, is the first to propose a new Web API implementation method that is suitable for vertical distribution, in which servers having computational capabilities are disposed on network paths in a distributed manner. This embodiment may become the de facto standard for the method of implementing APIs in the era of 5G. Operations and advantages of this embodiment include the following three points.

—Ultra-Low Latency—

According to this embodiment, it is possible to immediately return responses to player terminals 30 from MEC infrastructure on a mobile network. Thus, the time needed for returning responses is, for example, about 10 ms, which is a considerable reduction compared with the time needed in the case of returning responses from the cloud side (about 100 ms to 200 ms). This means that it is possible to use server-side functions at a frequency corresponding to every frame (about 16 ms) in a 60-FPS game; i.e., it is possible to realize low latency that is entirely different from the latency in existing games.

—Scalability—

According to this embodiment, for example, when a single Web API is called by millions of player terminals 30, the edge-side servers 20, while immediately (in a few milliseconds) returning tentative responses to the player terminals 30, aggregate a plurality of requests received, and call the same Web API on the cloud-side server 10. Therefore, at the cloud-side server 10, it is possible to reduce the number of simultaneous connections to the number of edge-side servers 20 at most.

—Compatibility—

According to this embodiment, by adopting an API with which a first response with low latency and a second response with normal latency are combined, it is possible to construct a game with which the apparent latency of network accesses from players operating player terminals 30 is reduced to less than ten milliseconds, while maintaining a simple REST API, without having to considerably change the API of the cloud-side server 10. Furthermore, during the period of transition from 4G to 5G or in environments in which fixed circuits and 5G coexist, it is possible to distribute the loads of connections other than 5G connections by using a conventional cloud-side load balancer, which makes it possible to smoothly introduce this embodiment additionally to an existing system.

Second Embodiment

"Configuration"

Each edge-side server 20 in the first embodiment calculates "a tentative aggregation result for requests received in parallel", in which the results for requests from some of a plurality of spatially distributed players are aggregated. Meanwhile, each edge-side server 20 in this embodiment calculates "a tentative aggregation results for successively received requests", in which the results for a plurality of requests transmitted by a single player with differences in time are aggregated. This will be described below in detail.

The edge reception unit 21 of each edge-side server 20 receives a plurality of requests transmitted from a single player terminal 30 with time differences. The first edge processing unit 22 executes processing based on the requests, and transmits the result of processing based on the requests to the player terminal 30 as a first response to the requests. The second edge processing unit 23 calculates "a tentative aggregation request for successively received requests", in which the results of processing based on the plurality of requests transmitted from the player terminal 30 with time differences are aggregated, and transmits the "tentative aggregation result for successively received requests" to the cloud-side server 10.

The cloud processing unit 12 of the cloud-side server 10 executes processing based on the "tentative aggregation result for successively received requests", and transmits the result of processing based on the "tentative aggregation result for successively received requests" to the edge-side server 20. The second edge processing unit 23 of the edge-side server 20, upon receiving the result of processing based on the "tentative aggregation result for successively received requests" from the cloud-side server 10, transmits the result to the player terminal 30 as a second response to the requests.

Figure 12:
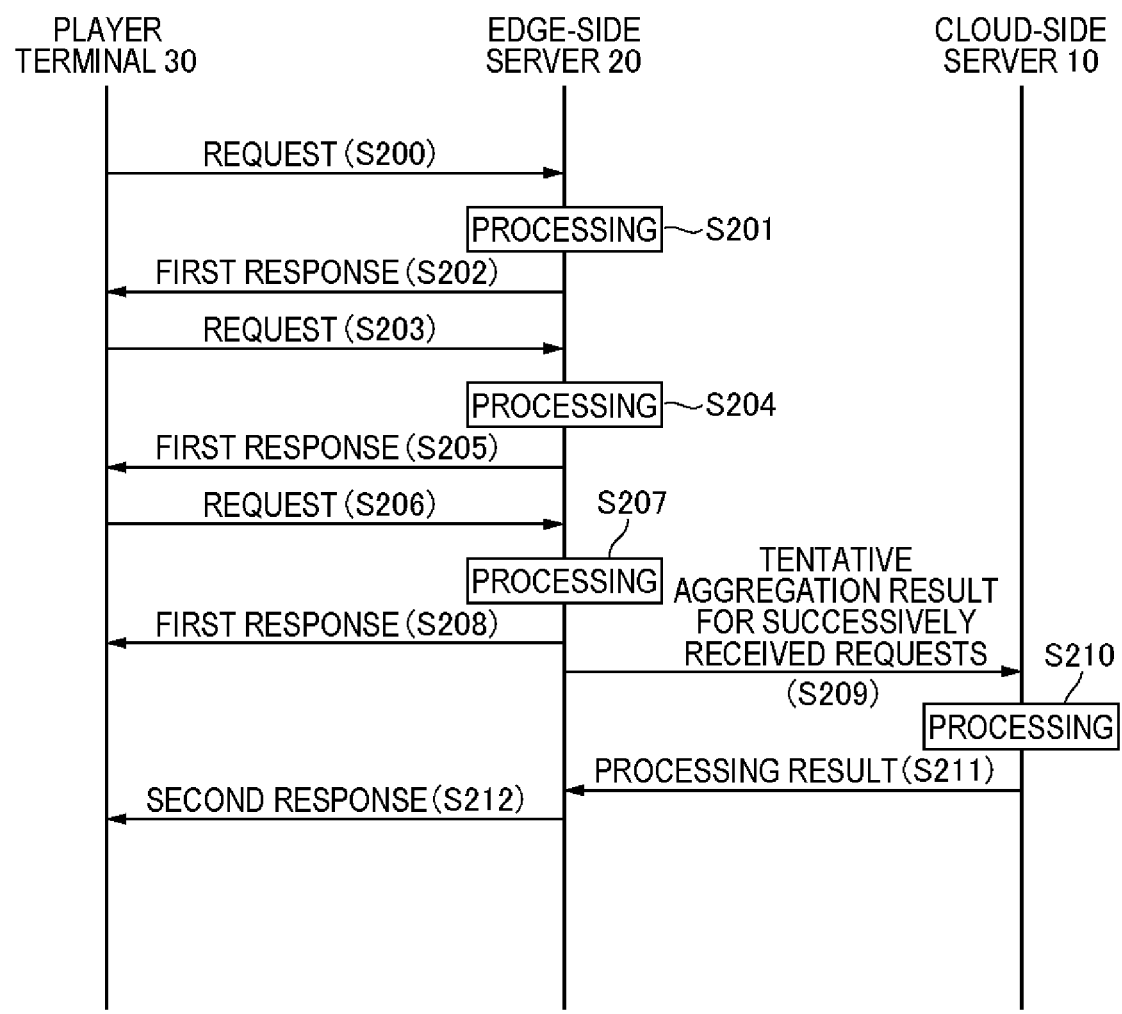
FIG. 12 is a sequence chart showing an example flow of processing by a game system according to this embodiment.

FIG. 12 shows an example flow of the processing. When a player terminal 30 transmits a request to an edge-side server 20 (S200), the edge-side server 20 executes processing based on the request (S201), and transmits the result of processing to the player terminal 30 as a first response to the request (S202).

Then, when the player terminal 30 transmits a request to the edge-side server 20 (S203), the edge-side server 20 executes processing based on the request (S204), and transmits the result of processing to the player terminal 30 as a first response to the request (S205).

Then, when the player terminal 30 transmits a request to the edge-side server 20 (S206), the edge-side server 20 executes processing based on the request (S207), and transmits the result of processing to the player terminal 30 as a first response to the request (S208).

Note that although the transmission and reception of a request and a first response are repeated three times here, the number of times is not limited thereto.

Then, when a predefined certain timing arrives, the second edge processing unit 23 transmits a "tentative aggregation result for successively received requests", in which the results of processing for the requests that have been received thus far (S200, S203, and S206) are aggregated, to the cloud-side server 10 (S209).

The cloud-side server 10 executes processing based on the "tentative aggregation result for successively received requests" (S210), and transmits the result of processing to the edge-side server 20 (S209). The edge-side server 20 transmits the result of processing received from the cloud-side server 10 to the player terminal 30 as a second response to the requests (S200, S203, and S206) (S212).

Also in this embodiment, each player terminal 30 receives a first response and a second response to a request via asynchronous I/O. Thus, the player terminal 30 can perform other processing during the period after the first response is received and before the second response is received.

Although the details of requests transmitted from player terminals 30 are not limited, an example is synchronization requests for saving, on the server side, management information (status information of player characters, etc.) managed by the player terminals 30.

In this case, a player terminal 30 and an edge-side server 20 can transmit and receive the latest management information and a synchronization request per prescribed period $T_1$ (S200, S203, and S206).

Then, the first edge processing unit 22 of the edge-side server 20 executes processing for storing the received management information in an edge storage device (the storage unit 24) (S201, S204, and S207), and transmits a message indicating successful processing to the player terminal 30 as a first response (S202, S205, and S208).

The second edge processing unit 23 of the edge-side server 20, per prescribed period $T_2$ ($T_2$ is greater than $T_1$), transmits the latest management information stored in the edge storage device (the storage unit 24) to the cloud-side server 10 as "a tentative aggregation result for successively received requests" (S209).

The cloud processing unit 12 of the cloud-side server 10 executes processing for storing the management information received as the "tentative aggregation result for successively received requests" in a cloud storage device (the storage unit 13) (S210), and transmits a message indicating successful processing to the edge-side server 20 as the result of processing based on the "tentative aggregation result for successively received requests" (S211).

Note that the game system according to this embodiment may be configured to be able to execute spatial aggregation processing described in the context of the first embodiment, in addition to the temporal aggregation processing described in the context of this embodiment.

The game system according to this embodiment is otherwise configured similarly to the first embodiment.

EXAMPLE

Next, an example of the second embodiment will be described. An overview of this example is shown in FIG. 11. This example will be described in the context of an example where, with a native game app, data is saved and synchronized on the server side, for example, at a frequency corresponding to every frame.

With existing native apps, since communication with a cloud server has been processing with relatively high latency, it has been the case to perform communication at such timings when prescribed delays do not cause problems, e.g., between stages as well as before and after battles. With such implementation methods, however, in cases such as the case where communication is temporarily disconnected in the middle of the game, since it is difficult to distinguish whether the disconnection is due to an intentional act of fraud (cheating) or is an inevitable disconnection of communication, it has been the case to handle such cases, for example, uniformly as no contests. For players who do not conduct acts of fraud, since such handling is stressful, it has been necessary to enjoy games in places where communication conditions are stable.

When this example is applied, it is possible on the server side to save (synchronize) game status at a high frequency (e.g., a plurality of times per second) even during a game, such as a battle. This enables a cloud native service such that even when communication becomes disconnected, restoration is performed by reading status data from a server, without requiring rebooting on the client side.

With such real-time saving, [M1-1] and [M2-1] in FIG. 11 implement the same API for verifying and saving game data as a conventional game server, and [M1-2] implements processing for transmitting only the latest version of data to [M2] after saving data a plurality of times. This makes it possible to realize a saving function with low latency and with which the loads on the cloud side are considerably reduced.

Operations and Advantages

With the above-described game system according to this embodiment, operations and advantages similar to those of the first embodiment are realized. Furthermore, each edge-side server 20 can calculate "a tentative aggregation result for successively received requests", in which the results for a plurality of requests transmitted from a single player with time differences are aggregated, and can transmit the result to the cloud-side server 10. This expands the usage scenes of edge-side servers 20, which expands the range of utilization thereof.

The following additionally describes example reference modes.

1. A game system comprising a cloud-side server, an edge-side server, and a player terminal,
   wherein the edge-side server includes:
      an edge reception unit that receives requests transmitted from the player terminal;
      a first edge processing unit that executes processing based on the requests and transmits the result of processing based on the requests to the player terminal as a first response to the requests; and
      a second edge processing unit that, per certain period, transmits an aggregation result in which the results of processing based on the requests are aggregated to the cloud-side server, receives the result of processing based on the aggregation result, executed at the cloud-side server, and transmits the result of processing based on the aggregation result to the player terminal as a second response to the requests,
   wherein the cloud-side server includes:
      a cloud reception unit that receives the aggregation result transmitted from the edge-side server; and
      a cloud processing unit that executes processing based on the aggregation result and transmits the result of processing based on the aggregation result to the edge-side server, and
   wherein the player terminal includes:
      a terminal transmission/reception unit that transmits the requests and receives, for one of the requests, the first response and the second response in this order via asynchronous I/O from the edge-side server.

2. The game system according to 1,
   wherein the player terminal:
      performs a first presentation corresponding to the first response upon receiving the first response, and performs a second presentation corresponding to the second response upon receiving the second response, and
      starts the second presentation before the first presentation is finished.

3. The game system according to 1 or 2,
   wherein each of the plurality of player terminals communicates with one of the plurality of edge-side servers,
   wherein the edge reception unit receives the plurality of requests individually transmitted from the plurality of player terminals that communicate with the local edge-side server,
   wherein the second edge processing unit calculates a tentative aggregation result for requests received in parallel, in which the results of processing based on the plurality of requests individually transmitted from the plurality of player terminals that communicate with the local edge-side server are aggregated, and transmits the tentative aggregation result for requests received in parallel to the cloud-side server,
   wherein the cloud reception unit receives the tentative aggregation results for requests received in parallel, individually from the plurality of edge-side servers,
   wherein the cloud processing unit calculates a final aggregation result for requests received in parallel by aggregating the plurality of tentative aggregation results for requests received in parallel, and transmits the final aggregation result for requests received in parallel to the plurality of edge-side servers, and
   wherein the second edge processing unit transmits the received final aggregation result for requests received in parallel, as the second response, to the plurality of player terminals that communicate with the local edge-side server.

4. The game system according to 3,
   wherein the requests are attack requests indicating the content of attacks on an enemy character,
   wherein the tentative aggregation result for requests received in parallel, calculated by each of the edge-side servers, is a value of damage given to the enemy character, which is calculated on the basis of the plurality of attack requests transmitted from the plurality of player terminals that communicate with the edge-side server, and
   wherein the final aggregation result for requests received in parallel is the sum of the values of damage given to the enemy character, indicated by the individual tentative aggregation results for requests received in parallel, which are calculated individually by the edge-side servers.

5. The game system according to 1 or 2,
   wherein the edge reception unit receives the plurality of requests transmitted with time differences from one of the player terminals,
   wherein the second edge processing unit calculates a tentative aggregation results for successively received requests, in which the results of processing based on the plurality of requests transmitted with time differences from one of the player terminals are aggregated, and transmits the tentative aggregation result for successively received requests to the cloud-side server, and
   the cloud processing unit executes processing based on the tentative aggregation result for successively received requests, and transmits the result of processing based on the tentative aggregation results for successively received requests to the edge-side server.

6. The game system according to 1,
   wherein the requests are synchronization requests for saving, on the server side, management information managed by the player terminal,
   wherein the edge reception unit receives the latest management information and the synchronization request per prescribed period $T_1$,
   wherein the first edge processing unit executes processing for storing the received management information in an edge storage device, and transmits a message indicating successful processing to the player terminal as the first response,
   wherein the second edge processing unit, per prescribed period $T_2$ ($T_2$ is greater than $T_1$), transmits the latest management information stored in the edge storage device to the cloud-side server as the tentative aggregation result for successively received requests, and
   wherein the cloud processing unit executes processing for storing, in a cloud storage device, the management information received as the tentative aggregation result for successively received requests, and transmits a message indicating successful processing to the edge-side server as the result of processing based on the tentative aggregation result for successively received requests.

7. A game control method that is executed by a game system including a cloud-side server, an edge-side server, and a player terminal,
   wherein the edge-side server:
      receives requests transmitted from the player terminal;
      executes processing based on the requests and transmits the result of processing based on the requests to the player terminal as a first response to the requests; and
      per certain period, transmits an aggregation result in which the results of processing based on the requests are aggregated to the cloud-side server, receives the result of processing based on the aggregation result, executed at the cloud-side server, and transmits the result of processing based on the aggregation result to the player terminal as a second response to the requests,
   wherein the cloud-side server:
      receives the aggregation result transmitted from the edge-side server; and
      executes processing based on the aggregation result and transmits the result of processing based on the aggregation result to the edge-side server, and
   wherein the player terminal:
      transmits the requests and receives, for one of the requests, the first response and the second response in this order via asynchronous I/O from the edge-side server.

8. The edge-side server in a game system according to any one of 1 to 6.
9. The cloud-side server in a game system according to any one of 1 to 6.
10. The player terminal in a game system according to any one of 1 to 6.

This application claims the benefit of priority based on Japanese Patent Application No. 2020-176463 filed on 21 Oct. 2020, and the entire disclosure thereof is incorporated herein.

REFERENCE SIGNS LIST

1A Processor
2A Memory
3A Input/output interface
4A Peripheral circuit
5A Bus
10 Cloud-side server
11 Cloud reception unit
12 Cloud processing unit
13 Storage unit
20 Edge-side server
21 Edge reception unit
22 First edge processing unit
23 Second edge processing unit
24 Storage unit
30 Player terminal
31 Input unit
32 Output unit
33 Processing unit
34 Storage unit
35 Terminal transmission/reception unit
60 Internet
70 Mobile network
71 Base station
72 Core network
73 Internet gateway

The invention claimed is:

1. A game system comprising a cloud-side server, an edge-side server, and a player terminal,
   wherein the edge-side server includes:
      an edge reception unit that receives requests transmitted from the player terminal;
      a first edge processing unit that executes processing based on the requests and transmits the result of processing based on the requests to the player terminal as a first response to the requests; and
      a second edge processing unit that, per certain period, transmits an aggregation result in which the results of processing based on the requests are aggregated to the cloud-side server, receives the result of processing based on the aggregation result, executed at the cloud-side server, and transmits the result of processing based on the aggregation result to the player terminal as a second response to the requests,
   wherein the cloud-side server includes:
      a cloud reception unit that receives the aggregation result transmitted from the edge-side server; and
      a cloud processing unit that executes processing based on the aggregation result and transmits the result of processing based on the aggregation result to the edge-side server, and
   wherein the player terminal includes:
      a terminal transmission/reception unit that transmits the requests and receives, for one of the requests, the first response and the second response in this order via asynchronous I/O from the edge-side server.

2. The system according to claim 1,
   wherein the player terminal:
      performs a first presentation corresponding to the first response upon receiving the first response, and performs a second presentation corresponding to the second response upon receiving the second response, and
      starts the second presentation before the first presentation is finished.

3. The system according to claim 1,
   wherein each of the plurality of player terminals communicates with one of the plurality of edge-side servers, wherein the edge reception unit receives the plurality of requests individually transmitted from the plurality of player terminals that communicate with the local edge-side server, wherein the second edge processing unit calculates a tentative aggregation result for requests received in parallel, in which the results of processing based on the plurality of requests individually transmitted from the plurality of player terminals that communicate with the local edge-side server are aggregated, and transmits the tentative aggregation result for requests received in parallel to the cloud-side server, wherein the cloud reception unit receives the tentative aggregation results for requests received in parallel, individually from the plurality of edge-side servers, wherein the cloud processing unit calculates a final aggregation result for requests received in parallel by aggregating the plurality of tentative aggregation results for requests received in parallel, and transmits the final aggregation result for requests received in parallel to the plurality of edge-side servers, and wherein the second edge processing unit transmits the received final aggregation result for requests received in parallel, as the second response, to the plurality of player terminals that communicate with the local edge-side server.

4. The system according to claim 3, wherein the requests are attack requests indicating the content of attacks on an enemy character, wherein the tentative aggregation result for requests received in parallel, calculated by each of the edge-side servers, is a value of damage given to the enemy character, which is calculated on the basis of the plurality of attack requests transmitted from the plurality of player terminals that communicate with the edge-side server, and wherein the final aggregation result for requests received in parallel is the sum of the values of damage given to the enemy character, indicated by the individual tentative aggregation results for requests received in parallel, which are calculated individually by the edge-side servers.

5. The system according to claim 1, wherein the edge reception unit receives the plurality of requests transmitted with time differences from one of the player terminals, wherein the second edge processing unit calculates a tentative aggregation results for successively received requests, in which the results of processing based on the plurality of requests transmitted with time differences from one of the player terminals are aggregated, and transmits the tentative aggregation result for successively received requests to the cloud-side server, and the cloud processing unit executes processing based on the tentative aggregation result for successively received requests, and transmits the result of processing based on the tentative aggregation results for successively received requests to the edge-side server.

6. The system according to claim 1, wherein the requests are synchronization requests for saving, on the server side, management information managed by the player terminal, wherein the edge reception unit receives the latest management information and the synchronization request per prescribed period $T_1$, wherein the first edge processing unit executes processing for storing the received management information in an edge storage device, and transmits a message indicating successful processing to the player terminal as the first response, wherein the second edge processing unit, per prescribed period $T_2$ ($T_2$ is greater than $T_1$), transmits the latest management information stored in the edge storage device to the cloud-side server as the tentative aggregation result for successively received requests, and wherein the cloud processing unit executes processing for storing, in a cloud storage device, the management information received as the tentative aggregation result for successively received requests, and transmits a message indicating successful processing to the edge-side server as the result of processing based on the tentative aggregation result for successively received requests.

7. The edge-side server in a game system according to claim 1.

8. The cloud-side server in a game system according to claim 1.

9. The player terminal in a game system according to claim 1.

10. A game control method that is executed by a game system including a cloud-side server, an edge-side server, and a player terminal, wherein the edge-side server:
receives requests transmitted from the player terminal;
executes processing based on the requests and transmits the result of processing based on the requests to the player terminal as a first response to the requests; and
per certain period, transmits an aggregation result in which the results of processing based on the requests are aggregated to the cloud-side server, receives the result of processing based on the aggregation result, executed at the cloud-side server, and transmits the result of processing based on the aggregation result to the player terminal as a second response to the requests, wherein the cloud-side server:
receives the aggregation result transmitted from the edge-side server; and
executes processing based on the aggregation result and transmits the result of processing based on the aggregation result to the edge-side server, and wherein the player terminal:
transmits the requests and receives, for one of the requests, the first response and the second response in this order via asynchronous I/O from the edge-side server.

* * * * *